United States Patent [19]

Topf

[11] Patent Number: 5,474,720
[45] Date of Patent: Dec. 12, 1995

[54] METHOD OF AND APPARATUS FOR PRODUCING ELONGATED SHAPED BODIES OF THERMOPLASTIC SYNTHETIC RESIN

[75] Inventor: Siegfried Topf, Traun, Austria

[73] Assignee: Friedrich Theysohn GmbH, Langenhagen, Germany

[21] Appl. No.: 212,181

[22] Filed: Mar. 11, 1994

[51] Int. Cl.⁶ .............................. B29C 47/40; B29C 47/92
[52] U.S. Cl. ................ 264/40.1; 264/177.1; 264/211.23; 425/140; 425/380; 425/382.3; 425/382.4; 425/464; 425/146
[58] Field of Search ................... 264/40.1, 209.2, 264/176.1, 349, 40.5, 40.7, 177.1, 211.23; 425/380, 464, 382.3, 140, 146, 382.4

[56] References Cited

U.S. PATENT DOCUMENTS

| | | | |
|---|---|---|---|
| 3,046,602 | 7/1962 | Houvener | 425/464 |
| 3,256,563 | 6/1966 | Criss et al. | 425/464 |
| 3,313,003 | 4/1967 | O'Brien | 425/464 |
| 4,134,715 | 1/1979 | Cueto | 425/464 |
| 4,234,018 | 11/1980 | Herrington, Jr. | 425/464 |
| 4,761,129 | 8/1988 | Aste et al. | 425/382.3 |
| 4,906,171 | 3/1990 | Miller | 425/382.3 |
| 5,067,885 | 11/1991 | Stevenson et al. | 425/464 |
| 5,238,385 | 8/1993 | Johnson | 425/382.3 |

*Primary Examiner*—Mathieu D. Vargot
*Attorney, Agent, or Firm*—Herbert Dubno

[57] ABSTRACT

Upstream of a distributor at which flow from an actuator is fed to the shaping orifices for the production of plastic extrusions and downstream of the extruder producing the stream of plastified plastic, a rotary adapter having a displacement body subdividing its cross section into asymmetrical partial cross sections is provided so that, upon deviation of a property of the extrusions from a desired value, the adapter can be rotated to compensate.

10 Claims, 3 Drawing Sheets

METHOD OF AND APPARATUS FOR PRODUCING ELONGATED SHAPED BODIES OF THERMOPLASTIC SYNTHETIC RESIN

FIELD OF THE INVENTION

My present invention relates to a method of and an apparatus for producing elongated shaped bodies, hereinafter referred to as profiled bodies or extrusions, from a thermoplastic synthetic resin material, i.e. a plastic, utilizing a plastifying unit such as a worm or screw extruder. More particularly the invention relates to the simultaneous production of a plurality of such extrusions.

BACKGROUND OF THE INVENTION

Normally an extrusion of thermoplastic synthetic resin material, i.e. a plastic, can be formed by plastifying the synthetic resin material in a plastifying unit which consists of an elongated worm housing, one or more worms rotatable about the worm axis or the worm axes, an inlet at one end of the plastifier chamber and an outlet at the opposite end for the material to be plastified and the plastified or liquefied stream of synthetic resin, respectively. The plastifying unit, generally referred to as an extruder, can be followed by an extrusion die having an orifice from which the profiled body or extrusion emerges.

The reference to a profiled body is, for the purposes of this disclosure, intended to cover any extruded body having a shape imparted by the extrusion orifice or a forming die provided downstream thereof and can include polygonal, circular or compound cross section bodies, solid bodies as well as hollow bodies, and structural shapes of all sorts. They may be, for example, profiles used in the fabrication of windows (window-structural shapes) or bodies which are extruded around wires or cores as in the case of cables as outer sheaths or the like, etc.

When two or more extrusions are simultaneously produced from the extrusion die or shaping member at the discharge side of the extruder, it is found that there are limits to the quality product which can be produced. These limitations result from the fact that certain speeds of extrusion of the plastic through the apparatus cannot be exceeded because there are limits of the cooling speed. For given maximum length of the extrusion apparatus, because of the poor heat conductivity of the plastic, there are extrusion speed limitations since the extruded body at the outlet side of the extrusion orifice must be such that the body will retain its shape against flow under the effect of gravity or will not further deform.

There are indeed extruders with high outputs but in many cases these have other drawbacks. As a result, when increased output is desired, it is generally necessary to provide two or more extruders. When two bodies are simultaneously extruded from a single apparatus, control of the quality of the respective extrusion has been a problem.

OBJECTS OF THE INVENTION

It is, therefore, the principal object of the present invention to provide an improved apparatus for producing two or more extrusions simultaneously, whereby the drawbacks described above are obviated.

It is also an object of this invention to provide an improved method of producing extrusions at high output rates with uniform and constant quality, high dimensional precision and at reduced cost.

Still another object of the invention is to provide an improved method of and apparatus for producing extrusions whereby drawbacks of earlier techniques are avoided.

SUMMARY OF THE INVENTION

These objects are attained, in accordance with the invention, by providing the outlet unit of the apparatus with at least two separate orifices and disposing upstream of the outlet unit between the end of the worm or worms and the orifices, a distributor which distributes the flow from the worms to the orifices. Between the end of the worm and the distributor there is at least one annular adapter which is rotatable about its axis coinciding with the axis of the outlet of the actuator housing and thus relative to the housing and to the distributor. Within this adapter, there is fixed a displacement body, i.e. a body which displaces the flow of the plastified material to one side and another, and which subdivides the flow cross section of the adapter into at least two asymmetrical flow paths and preferably into at least three asymmetrical divided flow paths.

Advantageously, the divided flow paths are asymmetrical with respect to the axis of the adapter.

Means can be provided for rotating the adapter and thereby varying the flow characteristics through the distributor and the properties of the extrusions which emerge at the orifices.

Surprisingly it has been found that, with the comparatively simple asymmetrical adapter, it is possible with rotation to render the extrusions which emerge at the orifices, uniform, dimensionally consistent and precise, and consistent over long extrusion periods at high extrusion rates.

Indeed, with the apparatus of the invention, the output of the profiled bodies or extrusions can be at least doubled by comparison with a system without the rotary adapter, especially when two extrusions are simultaneously produced from respective orifices.

The flow from the extruder is divided by the adapter into two separate partial streams which are delivered to the respective orifices and the orifices can have identical shapes or different shapes to produce extrusions of the identical cross section or different cross sections.

When there is a distribution of the flow from the extruder to the individual orifices, there can be a problem with flow path differences and changes in the characteristics of the material which cannot be eliminated by a fixed construction of the paths.

These differences can result in differences in the quality of the two extrusions or can adversely affect the dimensions of the extrusions.

By rotating the adapter upstream of the distributor and between the distributor and the outlet of the extruder, a rapid compensation for any changes in the characteristics of the material can be obtained.

The rotation of the adapter with its asymmetrical flow paths changes the flow of material in a rapid manner to allow the quality of the product to be restored. The adapter can be rotated by hand or automatically.

For automatic operation, the adapter can be provided with a controller which responds to a comparison of a setpoint value of a measurable property such as the actual value of the pressure in the flow paths in the distributor or the dimensions of the extrusions emerging from the orifices. The dimensions which may be measured can be the wall thicknesses of hollow extrusions.

In the method aspects of the invention, therefore, the thermoplastic material can be plastified in a worm extruder and fed through an outlet at one end thereof into a distributor for discharge from the orifices of the outlet unit in respective extrusions, the quality of the extrusions being controlled by rotating an adapter between the distributor and the extruder and having its flow cross section subdivided into a plurality of asymmetric flows to compensate for variations in the quality of the extrusions produced.

The apparatus for producing elongated shaped extrusions can comprise:

- a plastifier for an extrudable plastic having an elongated housing and at least one plastifying worm rotatable about an axis of the worm in the housing, the housing having an inlet for plastic material to be plastified at one end, and an outlet at an opposite end thereof discharging plastified plastic;
- a discharge unit communicating with the outlet and formed with at least two separate shaping orifices from which respective shaped extrusions emerge and respective passages communicating with the orifices;
- a distributor upstream of the discharge unit and communicating with the outlet for dividing a stream of plastified plastic into respective flows delivered by the distributor to the passages;
- a rotary adapter between the outlet and the distributor, rotatable about an axis of the adapter and the outlet and formed with a flow cross section communicating between the outlet and the distributor, the flow cross section being subdivided by a displacement body into a plurality of discrete flow paths; and
- means for rotating the adapter to vary characteristics of the extrusions emerging from the shaping orifices.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

In the following description, we will refer to an actuator 1 of the double-worm type. Of course a single-worm extruder can be used as well and we can also make use of an extruder having more than two worms. Furthermore, more than two outlet orifices can be provided to extrude more than two extrusions.

Figure 1:
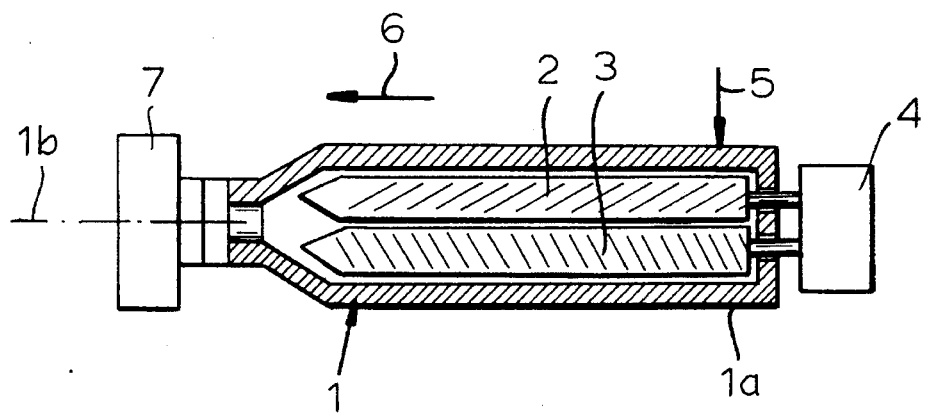
FIG. 1 is a diagrammatic cross section of an extruder according to the invention.

The extruder 1 shown in FIG. 1 comprises an extruder housing 1a which is elongated and has an axis 1b. Within the housing 1a, having an inlet 5 for the thermoplastic material to be plastified, are a pair of screws 2 and 3 disposed adjacent one another and rotated in opposite senses by a drive 4 about their respective axes. Each of the worms 2 and 3 comprises an elongated body having a helical rib represented by inclined lines in FIG. 1. The worms 2 and 3, as is conventionally the case, can interengage. Because of the shear and mixing forces applied to the synthetic resin, and the heat generated by friction and/or the application of heat from other sources at the extruder housing, the synthetic resin material is plastified, i.e. converted into a flowable liquid which is forced in the direction of arrow 6 through an extrusion die 7 forming the outlet element of the apparatus to produce continuous extrusions.

For this purpose, the die 7 is provided with shaping orifices 14 and 15 respectively communicating with flow passages 12 and 13 separated by a body 17 which can be formed at its upstream end with a partition 18 extending into the flow cross section of a distributor disk 11a upstream of the distributor portion 11 of the die which is provided with the passages 12 and 13. Upstream of the distributor portion 11a is an adapter 10 which is annular and is provided with a flow cross section 10a subdivided by a displacement body 16 into a plurality of flow paths 16a, 16b and 16c(FIG. 5), respectively. The body 16 is so shaped that its leading and trailing sides, with respect to the direction of flow, are streamlined or tapered.

The body 16 can be T-shaped or can have another geometric form such that the flow cross section is asymmetric.

Figure 2:
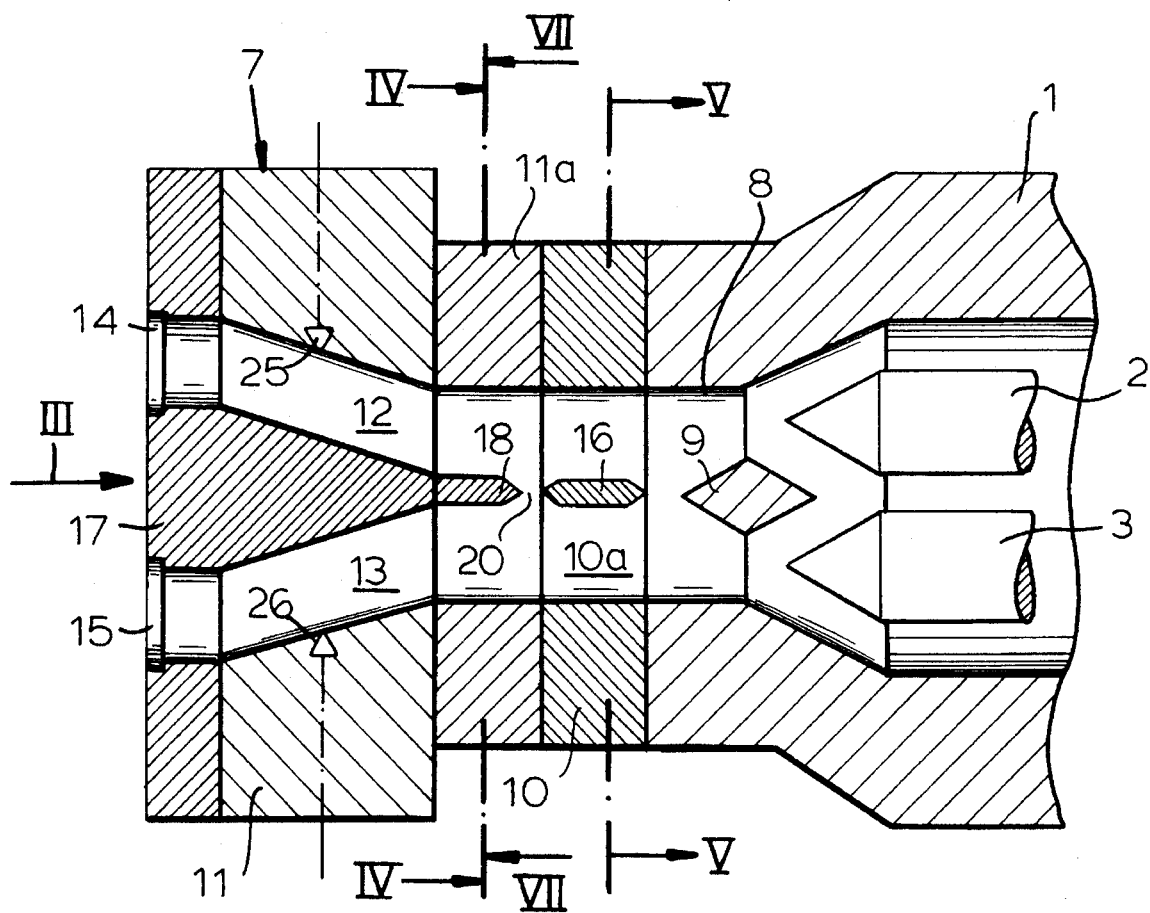
FIG. 2 is a detail view of the apparatus drawn to a larger scale.
Figure 3:
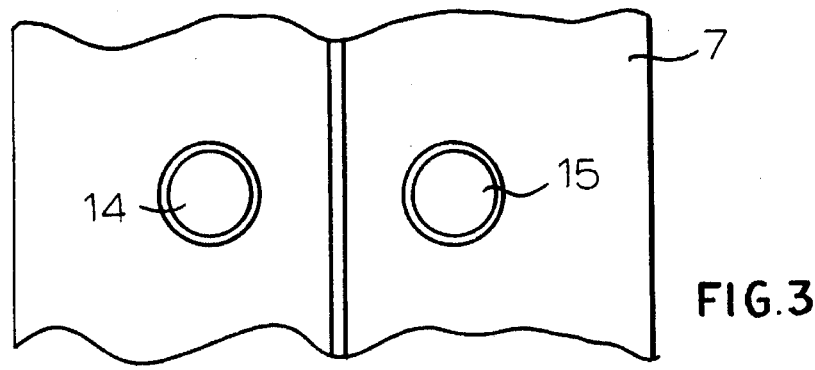
FIG. 3 is an end view taken in the direction of the arrow III of FIG. 2.
Figure 4:
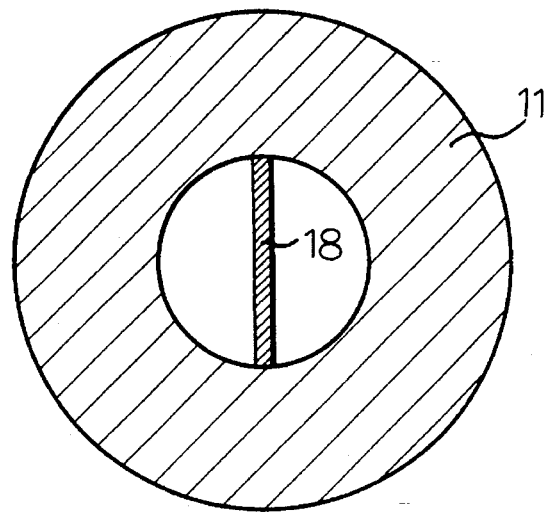
FIG. 4 is a section taken along the line IV—IV of FIG. 2.

The tip of the partition 18 can also be streamlined facing the flow from the extruder and is disposed centrally of the core 17 and can approach the displacement body 16. Between the partition 18 and the displacement body 16 a gap 20 can remain as can be seen in FIG. 2.

Figure 8:
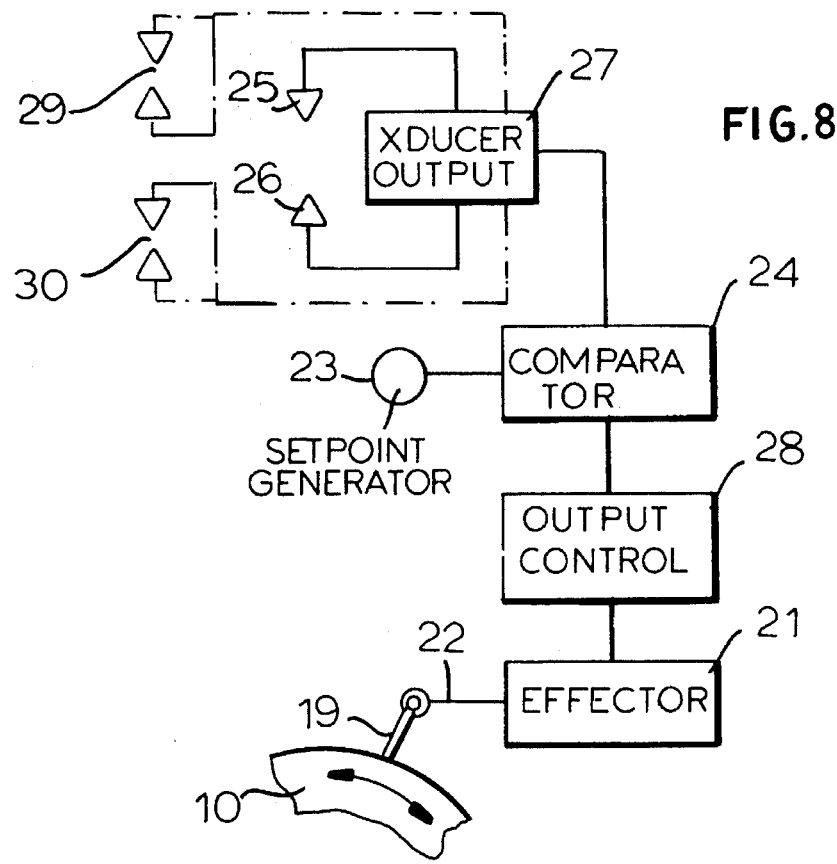
FIG. 8 is a block diagram of a control system used for rotating the adapter.

The adapter 10 can be provided with means, e.g. a lever 19, for rotating it by hand. Since the displacement body 16 is fixed in the adapter 10, it is rotated with the adapter as a comparison of FIGS. 5 and 6 will show. The adapter 10 can also be automatically rotated, e.g. by means of an effector 21 such as a pneumatic or hydraulic cylinder whose piston 22 can be linked to the lever 10 (FIG. 8).

For this purpose, a setpoint generator 23 can be provided to feed a desired value or setpoint signal to a comparator 24 which receives an input representing, e.g. pressure or wall thickness dimensions from a transducer output 27 whose transducers may be pressure sensors 25 and 26 provided in the distributor 11 to measure the pressure in the passages 12 and 13. These actual value pressure measurements are compared in the comparator 24 and the error signal is fed to the output controller 28 as a correction signal for the effector.

With hollow extrusions, the wall thickness can be detected by the sensors 29 and 30 and compared with a wall thickness setpoint to control the position of the rotary adapter 10.

Figure 5:
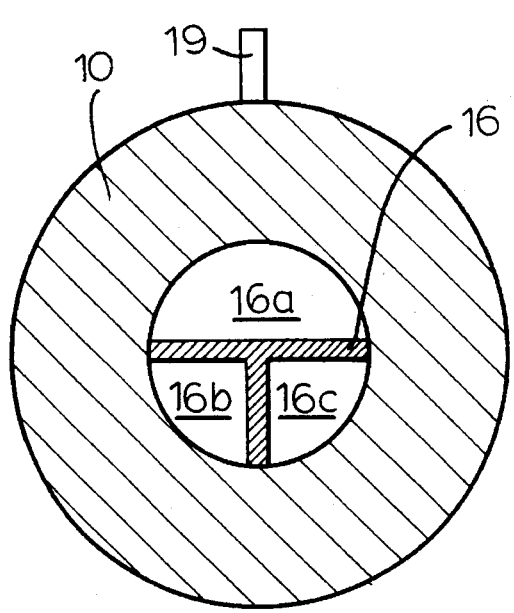
FIG. 5 is a section taken along the line V—V of FIG. 2.
Figure 6:
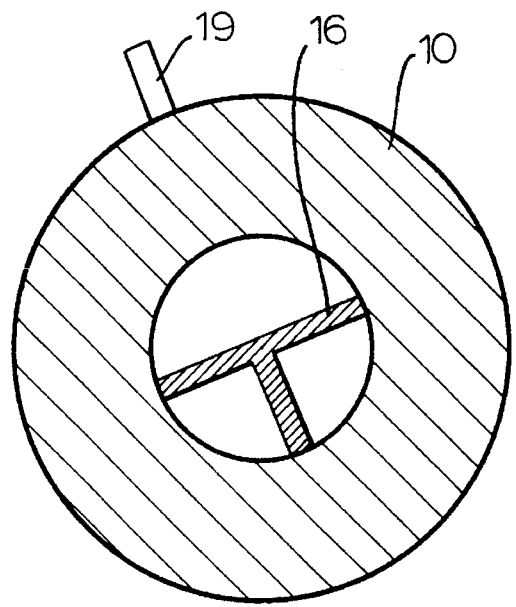
FIG. 6 is a section corresponding to FIG. 5 showing a different position of the rotatable adapter.
Figure 7:
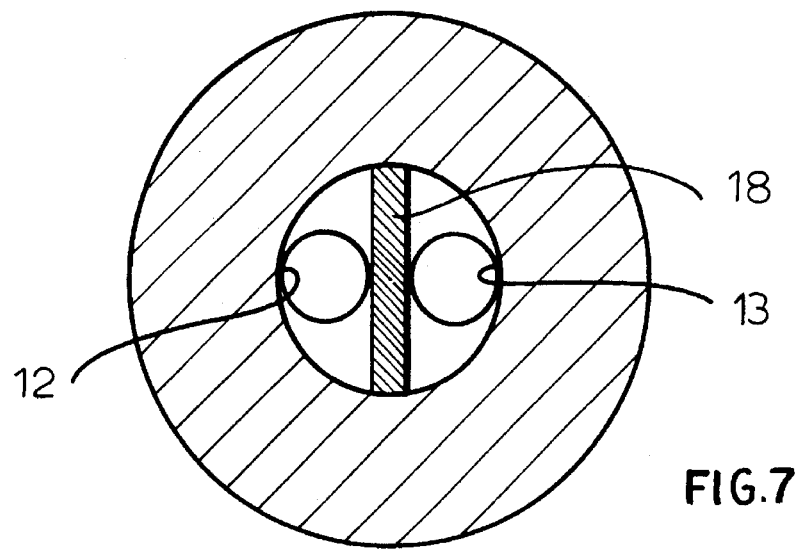
FIG. 7 is a section along the line VII—VII of FIG. 2 but in the same orientation of FIG. 4.

At start-up, the adapter can have, for example, the position shown in FIG. 5. As long as the quality of the extrusions and their dimensions remain constant, this position is not altered. Upon a fluctuation which can result from a change in the supplied materials, the adapter 10 is automatically rotated about its axis until the change is compensated and the new position, e.g. that of FIG. 6, is maintained until there is another fluctuation. Since the displacement body 16 asymmetrically breaks up flow, the adapter 10 affects the flow into the passages 12 and 13 differently.

Of course two or more such adapters with different asymmetrical flow distributions can be disposed axially behind one another to provide greater control. This has been found to be especially advantageous when more than two orifices 14 and 15 are provided. Between such rotary adapters, a further distributor can be provided.

I claim:

1. An apparatus for producing elongated shaped extrusions of plastic, said apparatus comprising:

a plastifier for an extrudable plastic having an elongated housing having a housing axis and at least one plastifying worm rotatable in said housing, said housing having an inlet for plastic material to be plastified at one end, and an outlet lying along said axis at an opposite end of said housing discharging plastified plastic;

an adapter rotatable about said axis at said opposite end of said housing and having a flow cross section aligned along said axis with said outlet, said adapter being provided with a displacement body extending parallel to said axis and subdividing said flow cross section asymmetrically into a plurality of flow paths generally parallel to said axis;

a discharge unit axially aligned with said adapter and formed with at least two separate shaping orifices from which respective shaped extrusions emerge and respective passages communicating with said orifices, said passages further communicating along said axis with said flow paths; and means for rotating said adapter about said axis to vary characteristics of the extrusions emerging from said shaping orifices.

2. The apparatus defined in claim 1 wherein said displacement body is T-shaped in a cross section transverse to said axis.

3. The apparatus defined in claim 1, further comprising a respective pressure sensor at each of said passages, said means for rotating said adapter being responsive to said pressure sensors.

4. The apparatus defined in claim 3, further comprising a comparator connected to said pressure sensors and provided with a setpoint generator for detecting a deviation of said pressures from a setpoint value for controlling said means for rotating said adapter.

5. The apparatus defined in claim 4, further comprising a controller connected to said comparator for displacing said adapter in response to a deviation output from said comparator.

6. The apparatus defined in claim 1, further comprising sensor means responsive to a change in quality of said extrusions, a comparator connected to said sensor means and provided with a setpoint generator and producing an output signal upon deviation of a characteristic of said extrusions from a setpoint value thereof, and control means connected to said comparator and responsive to said signal for displacing said adapter.

7. A method of producing extrusions, comprising the steps of:

(a) plastifying a plastic in an elongated plastifier having an axis and at least one worm to discharge axially at an end of said plastifier a continuous stream of plastified plastic;

(b) at said end of said plastifier passing said stream axially through an adapter rotatable about said axis and having a flow cross section lying along said axis and subdivided by a displacement body extending parallel to said axis asymmetrically into a plurality of flow paths generally parallel to said axis;

(c) feeding the stream from said flow paths axially through separate passages to respective extrusion orifices, shaping the plastic at said extrusion orifices and discharging continuously respective shaped extrusions from said orifices; and (d) rotating said adapter about said axis upon a change in a characteristic of said extrusions to compensate for said change.

8. The method defined in claim 7, further comprising the steps of:

measuring said change;

comparing a measured value of said change with a setpoint value representing a desired characteristic; and automatically displacing said adapter in response to a deviation of said measured value from said setpoint value.

9. The method defined in claim 8 wherein said measured value is a value of a pressure measured at each of said flows.

10. The method defined in claim 8 wherein said measured value is a measurement of dimensions of said extrusions.

\* \* \* \* \*